US012064971B2

(12) United States Patent
Aoki et al.

(10) Patent No.: US 12,064,971 B2
(45) Date of Patent: Aug. 20, 2024

(54) LIQUID DISCHARGE HEAD AND LIQUID DISCHARGE APPARATUS

(71) Applicants: Yuuta Aoki, Kanagawa (JP); Takeyuki Kobayashi, Kanagawa (JP)

(72) Inventors: Yuuta Aoki, Kanagawa (JP); Takeyuki Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 200 days.

(21) Appl. No.: 17/809,024

(22) Filed: Jun. 27, 2022

(65) Prior Publication Data

US 2023/0016931 A1 Jan. 19, 2023

(30) Foreign Application Priority Data

Jul. 14, 2021 (JP) ................................ 2021-116692

(51) Int. Cl.
*B41J 2/175* (2006.01)
*B41J 2/14* (2006.01)

(52) U.S. Cl.
CPC ............ *B41J 2/17513* (2013.01); *B41J 2/14* (2013.01); *B41J 2202/12* (2013.01)

(58) Field of Classification Search
CPC ........ B41J 2/175; B41J 2/17596; B41J 29/38; B41J 2/17566; B41J 2/18; B41J 2/17513; B41J 2/14; B41J 2202/12
See application file for complete search history.

(56) References Cited

U.S. PATENT DOCUMENTS

| | | | | |
|---|---|---|---|---|
| 2009/0009569 | A1 | 1/2009 | Sasaki | |
| 2012/0306950 | A1 | 12/2012 | Kobayashi et al. | |
| 2013/0044148 | A1 | 2/2013 | Kobayashi | |
| 2013/0057604 | A1 | 3/2013 | Masunaga et al. | |
| 2013/0127937 | A1 | 5/2013 | Masunaga et al. | |
| 2013/0135368 | A1 | 5/2013 | Kobayashi et al. | |
| 2013/0135401 | A1 | 5/2013 | Kobayashi et al. | |
| 2013/0147867 | A1 | 6/2013 | Kobayashi et al. | |
| 2015/0158308 | A1 | 6/2015 | Kobayashi et al. | |
| 2017/0136778 | A1 | 5/2017 | Kobayashi et al. | |
| 2018/0170087 | A1 | 6/2018 | Kobayashi et al. | |
| 2019/0092034 | A1* | 3/2019 | Goto | B41J 2/175 |
| 2021/0178773 | A1 | 6/2021 | Kobayashi | |

(Continued)

FOREIGN PATENT DOCUMENTS

| | | |
|---|---|---|
| JP | 2009-012244 | 1/2009 |
| JP | 2010-083021 | 4/2010 |

(Continued)

*Primary Examiner* — Jannelle M Lebron
(74) *Attorney, Agent, or Firm* — IPUSA, PLLC

(57) ABSTRACT

A liquid discharge head includes a first head tank configured to store a liquid, a first intermediate chamber storing the liquid flowing from the first head tank, a second intermediate chamber storing the liquid flowing from the first intermediate chamber in a flow direction of the liquid, a second head tank storing a liquid flowing from the second intermediate chamber, a first communicating part communicating with the first head tank and the first intermediate chamber, a second communicating part communicating with the second head tank and the second intermediate chamber, and a discharge part configured to discharge a liquid supplied from the first intermediate chamber and the second intermediate chamber.

15 Claims, 7 Drawing Sheets

(56) References Cited

U.S. PATENT DOCUMENTS

| | | | |
|---|---|---|---|
| 2021/0245534 A1 | 8/2021 | Morino et al. | |
| 2021/0276346 A1 | 9/2021 | Kobayashi et al. | |

FOREIGN PATENT DOCUMENTS

| | | |
|---|---|---|
| JP | 2011-088293 | 5/2011 |
| JP | 2014-046566 | 3/2014 |
| JP | 2014-076577 | 5/2014 |
| JP | 2014-076578 | 5/2014 |
| JP | 2016-153183 | 8/2016 |
| JP | 2019-177549 | 10/2019 |

* cited by examiner

LIQUID DISCHARGE HEAD AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-116692, filed on Jul. 14, 2021, in the Japan Patent Office, the entire disclosure of which is hereby incorporated by reference herein.

BACKGROUND

Technical Field

The present disclosure relates to a liquid discharge head and a liquid discharge apparatus for discharging a liquid.

Related Art

A liquid discharging apparatus includes a liquid discharge head to discharge a liquid. The liquid discharging apparatus discharges a liquid to a recording medium based on an image forming instruction from an information processing apparatus or the like. The liquid discharge apparatus is also called as an inkjet printer or the like.

The inkjet printer has various configurations. For example, there is known an inkjet printer that directly forming (printing) an image on a fabric such as clothing. The printer is called "DTG printer" where "DTG" is an abbreviation of "Direct To Garment". As an example of a DTG printer, there is DTG printer that includes a head tank to hold liquid ink at a position above a discharge nozzle of the liquid discharge head. The DTG printer feeds the liquid ink from an ink cartridge to the head tank by a pump and circulates the liquid ink, while the liquid is supplied to the discharge nozzle.

SUMMARY

A liquid discharge head includes a first head tank configured to store a liquid, a first intermediate chamber storing the liquid flowing from the first head tank, a second intermediate chamber storing the liquid flowing from the first intermediate chamber in a flow direction of the liquid, a second head tank storing a liquid flowing from the second intermediate chamber, a first communicating part communicating with the first head tank and the first intermediate chamber, a second communicating part communicating with the second head tank and the second intermediate chamber, and a discharge part configured to discharge a liquid supplied from the first intermediate chamber and the second intermediate chamber. The first intermediate chamber includes a first narrow part, a cross-sectional area of which is smaller than a cross-sectional area of the first communicating part in a direction orthogonal to the flow direction, and the second intermediate chamber includes a second narrow part, a cross-sectional area of which is smaller than a cross-sectional area of the second communicating part in the direction orthogonal to the flow direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
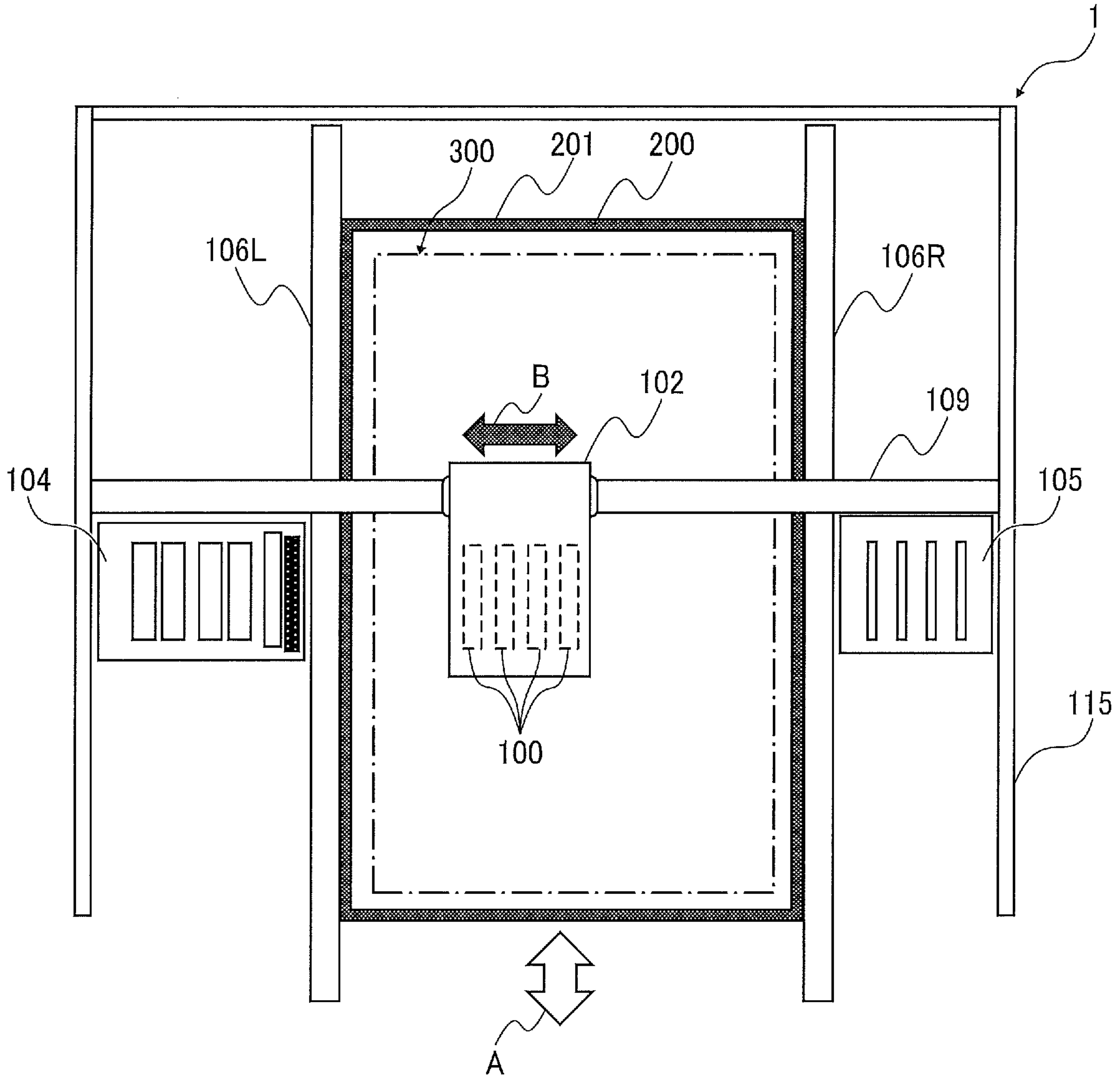
FIG. 1 is a schematic plan view of a liquid discharge apparatus illustrating a main portion of an internal structure of the liquid discharge apparatus according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

It will also be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements present. Referring now to the drawings, wherein like reference numerals designate identical or corresponding parts throughout the several views, embodiments of the present disclosure are described below.

Hereinafter, a liquid discharge apparatus 1 as an embodiment of a liquid discharge apparatus according to the present disclosure and a liquid discharge head 100 as an embodiment of a liquid discharge head according to the present disclosure are described below with reference to the drawings.

FIG. 1 is a schematic plan view of the liquid discharge apparatus 1 according to the present embodiment. The liquid discharge apparatus 1 includes a platen 300 at a position corresponding to a top surface of the cassette 200. The cassette 200 is held to an apparatus body 115 that is movable in a sub-scanning direction indicated by arrow "A" with respect to the apparatus body 115 including the liquid discharge apparatus 1. The sub-scanning direction is also referred to as a "feeding direction". The liquid discharge apparatus 1 includes a moving guide 106L and a moving guide 106R, each of longitudinal directions of which is arranged along the sub-scanning direction A. The moving guide 106L and the moving guide 106R serve as members to movably hold the stage 201 in the sub-scanning direction A. The stage 201 holds the cassette 200. The moving guide 106L and the moving guide 106R are disposed parallelly in a main-scanning direction indicated by arrow "B".

The liquid discharge apparatus 1 includes a carriage 102 to hold the liquid discharge head 100 that functions as image forming apparatus. The carriage 102 is held by the platen 300 that is movable in the main-scanning direction indicated by arrow "B"

The carriage 102 is movably held by a carriage guide 109 arranged along the main-scanning direction B. The carriage 102 reciprocally moves along the carriage guide 109 by a main scanning motor 139 described below. The liquid discharge head 100 is operated to discharge a predetermined amount of liquid ink at a predetermined timing while moving in the main scanning direction B by the carriage 102.

In the liquid discharge apparatus 1, the cassette 200 is mounted on a stage 201 movably held by the moving guides 106L and 106R in the apparatus body 115 of the liquid discharge apparatus 1 in a state in which a fabric serving as a medium is set on the platen 300 on the cassette 200. Then, the liquid discharge apparatus 1 repeats reciprocal movement of the stage 201 in the sub-scanning direction A and the reciprocal movement of the liquid discharge head 100 in the main-scanning direction B while discharging a predetermined amount of liquid ink from the liquid discharge head 100 to a predetermined position on the fabric held by the platen 300 to print a desired image on the fabric.

The platen 300 is detachably attachable from and to the cassette 200 and is replaceable. As a result, multiple platens 300 are prepared so that the fabric can be wound around another platen 300 during a printing operation. The platen 300 is simply replaced after completion of printing and fixing so that the liquid discharge apparatus can rapidly start a printing operation of the next fabric.

When the fabric is placed on the cassette 200, an outer peripheral cover of the platen 300 is opened to set (hold) the fabric on the platen 300. At this time, an excess part of the fabric (excess part) can be accommodated in an internal space of the cassette 200.

When an image is to be formed on the fabric, the cassette 200 is mounted (set) on the stage 201 of the apparatus body of the liquid discharge apparatus 1.

In the above-described manner, it becomes easy to set the fabric on the platen 300 since the entire cassette 200 is removable from the apparatus body of the liquid discharging apparatus 1, and the fabric to be printed is settable on the platen 300 on the cassette 200 removed from the apparatus body.

Figure 2:
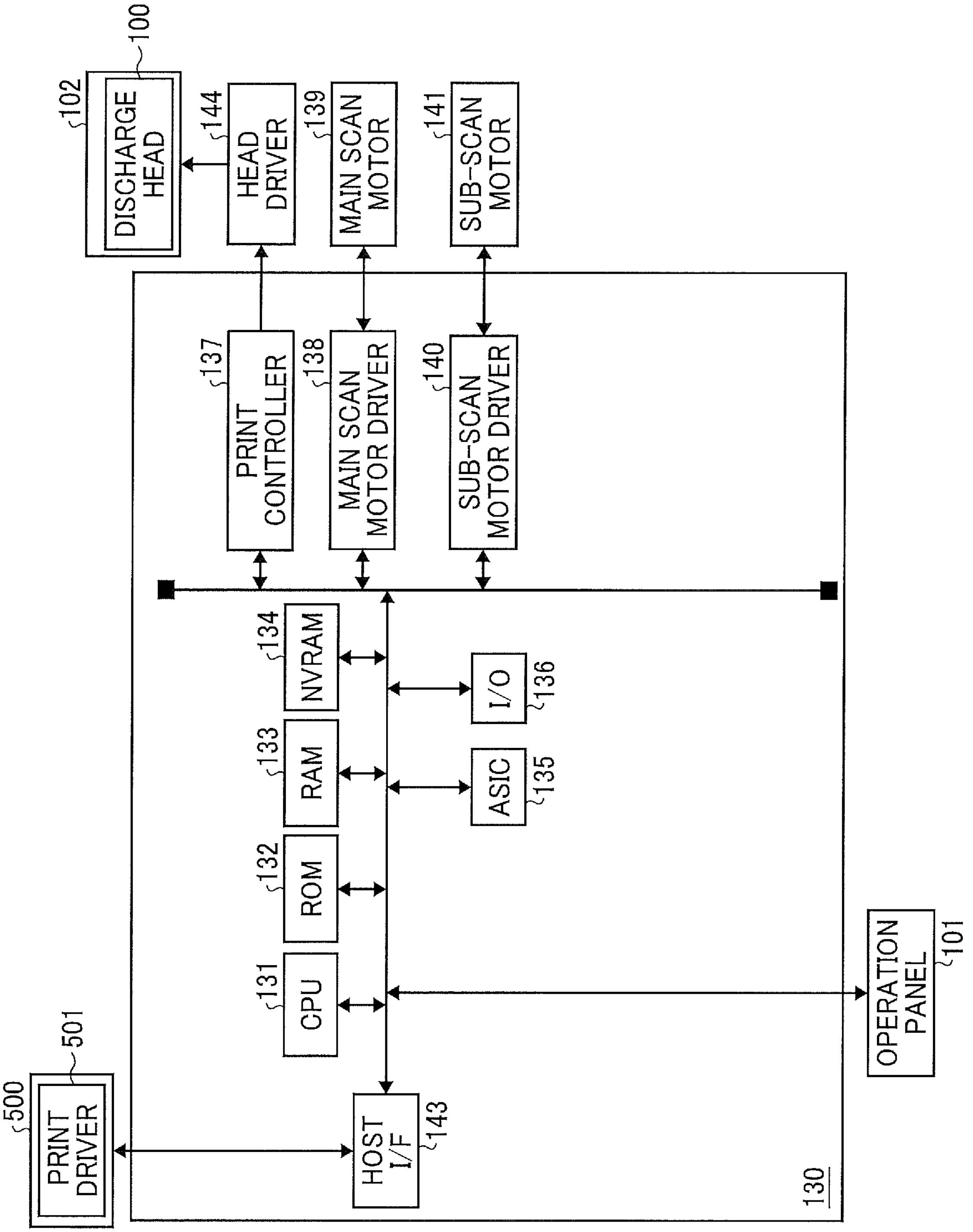
FIG. 2 is a control block diagram of a configuration of a liquid discharge head according to the first embodiment of the present disclosure.

As illustrated in FIG. 2, the liquid discharge apparatus 1 includes a maintenance mechanism 104 to maintain a state of the liquid discharge head 100 in a state suitable for an image forming operation (printing operation). The maintenance mechanism 104 is disposed outside the cassette 200 at one end in the main-scanning direction B. Further, the liquid discharge apparatus 1 includes a dummy-discharge receptacle 105 at a side end opposite to the maintenance mechanism 104 in the main scanning direction B. The dummy-discharge receptacle 105 collects the liquid discharged from the liquid discharge head 100 when a "dummy-discharge operation" is executed to prevent the liquid from being clogged in a nozzle 31 of the liquid discharge head 100.

[Outline of Control Block]

Next, a configuration of a control block of the liquid discharge apparatus 1 according to the present embodiment is described below with reference to FIG. 2.

As illustrated in FIG. 2, the controller 130 of the liquid discharge apparatus 1 includes a central processing unit 131 (CPU 131), a read only memory 132 (ROM 132), a random access memory 133 (RAM 133), a non-volatile random access memory 134 (NVRAM 134), and an application specific integrated circuit 135 (ASIC 135).

The CPU131 is coupled to an operation panel 101. The CPU 131 controls the entire liquid discharge apparatus 1. The operation panel 101 is used to input and display information for the liquid discharge apparatus 1. The CPU131 also has functions of controlling a conveyance operation of the platen 300 in the sub-scanning direction A, a moving operation of the carriage 102 in the main-scanning direction B, and the liquid discharge operation by the liquid discharge head 100.

The ROM132 is a nonvolatile storage medium that stores programs and other fixed data executed by the CPU131. The program stored in the ROM 132 is executed by the arithmetic processing function of the CPU131. Thus, the CPU 131 and the ROM 132 form a program controller described below.

The RAM 203 temporarily stores image data and the like used for an image forming process. The RAM 133 also functions as a work area when the program controller is executed by the CPU 131.

The NVRAM 134 is a nonvolatile rewritable storage media to hold data even while the power supply of the liquid discharge apparatus 1 is shut off.

The ASIC 135 performs image processing, such as various signal processing and sorting on image data and process input and output signals to control entire of the liquid discharge apparatus 1.

The controller 130 includes a host interface 143 (host I/F 143), a print controller 137, a main scan motor driver 138, a sub-scan motor driver 140, and an input-and-output unit 136 (I/O unit 136).

The host I/F 143 serves to transmit and receive data and control signals to and from a host, such as a print driver 501 of an external apparatus 500.

The print controller 137 generates a drive waveform for driving the liquid discharge head 100 and outputs image data for selectively driving a pressure generator of the liquid discharge head 100 and various data associated with the image data to the head driver 144.

The main scan motor driver 138 drives the main scan motor 139.

The sub-scan motor driver 140 serves to drive the sub-scan motor 141 to move the cassette 200 in the sub-scanning direction A.

The I/O unit 136 inputs detection signals, from various sensors, to operate the liquid discharge apparatus 1.

In the controller 130, the host I/F 143 receives print data and the like used for an image forming process from the print driver 501 of the external apparatus 500 via a cable or network. The print data is generated by a print driver 501 included in an external apparatus 500 as an information processing apparatus such as a personal computer (PC).

In the controller 130 receiving the print data as an image forming instruction, the CPU 131 reads out and analyzes the print data in a reception buffer included in the host I/F 143. Further, the ASIC135 performs desired image processing, data rearrangement processing, and the like, and transfers the print data to the print controller 137 according to an analyzing result of the CPU 131.

Therefore, the print controller 137 outputs image data and a drive waveform to the head driver 144 at a predetermined timing. Dot pattern data for image output may be generated by storing font data to the ROM132. The print driver 501 may develop the image data into bitmap data and transfer to the liquid discharge apparatus 1 to generate the dot pattern data. Here, it is assumed that the print driver 501 generates the dot pattern data for image output, for example.

The drive waveform generator of the print controller 137 includes a digital-to-analog (D/A) converter and an amplifier for digital-to-analog (D/A) conversion of pattern data of drive pulses stored in the ROM132 and read by the CPU131. The drive waveform generator of the print controller 137 outputs a drive waveform including one drive pulse or multiple drive pulses to the head driver 144. The head driver 144 drives the liquid discharge head 100 based on the image data (dot pattern data) corresponding to one line printed by the liquid discharge head 100 serially input to the liquid discharge head 100. The head driver 144 selectively applies drive pulses to the pressure generator of the liquid discharge head 100. The drive pulses include the drive waveform provided from the drive waveform generator of the print controller 137. Therefore, the CPU131 and the print controller 137 form an image forming processor (circuitry).

The head driver 144 includes, for example, a shift register to which a clock signal and serial data as image data are input, and a latch circuit that latches a resist value of the shift register by a latch signal. In addition, the head driver 144 includes a level conversion circuit (level shifter) that changes the level of the output value of the latch circuit, an analog switch array (switch) that is controlled to be turned on or turned off by the level shifter, and the like. Functionally, the head driver 144 controls turning ON or turning OFF of the analog switch array to selectively apply a desired drive pulse in the drive waveform to the pressure generator of the liquid discharge head 100, for example.

Further, the controller 130 controls an operation of a supply pump 52 described below to executes a liquid circulation process in the liquid discharge head 100.

First Embodiment of Liquid Discharge Head

Next, a configuration of the liquid discharge head 100 according to the first embodiment of the present disclosure is described below with reference to FIGS. 3 and 4.

A circulation operation of the liquid ink executed in the liquid discharge head 100 is also described below with reference to FIGS. 3 and 4.

Figure 3:
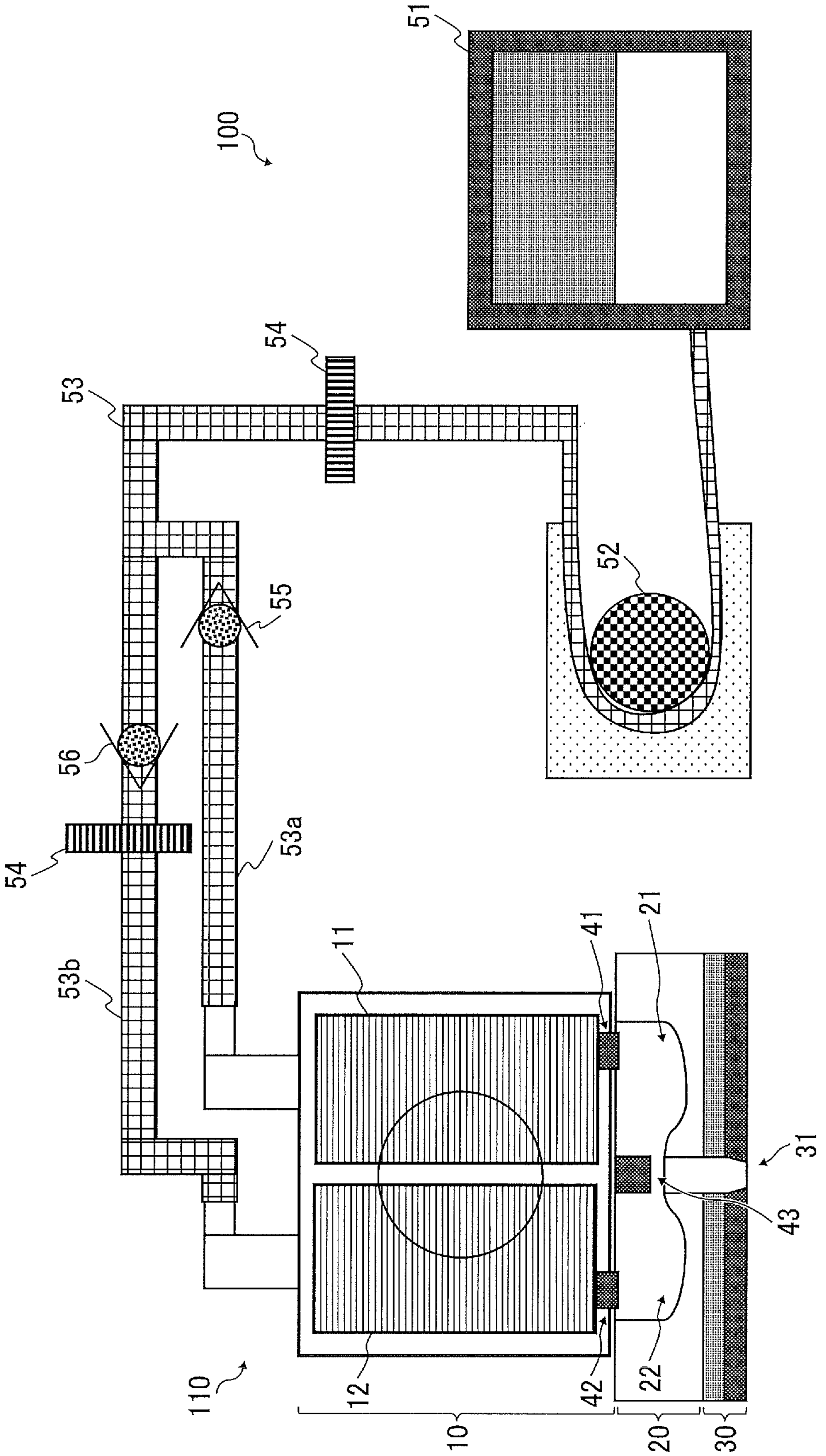
FIG. 3 is a schematic side view of the liquid discharge head according to the first embodiment of the present disclosure.

FIG. 3 is a schematic side view of the liquid discharge head 100 illustrating a configuration of the liquid discharge head 100.

Figure 4A:
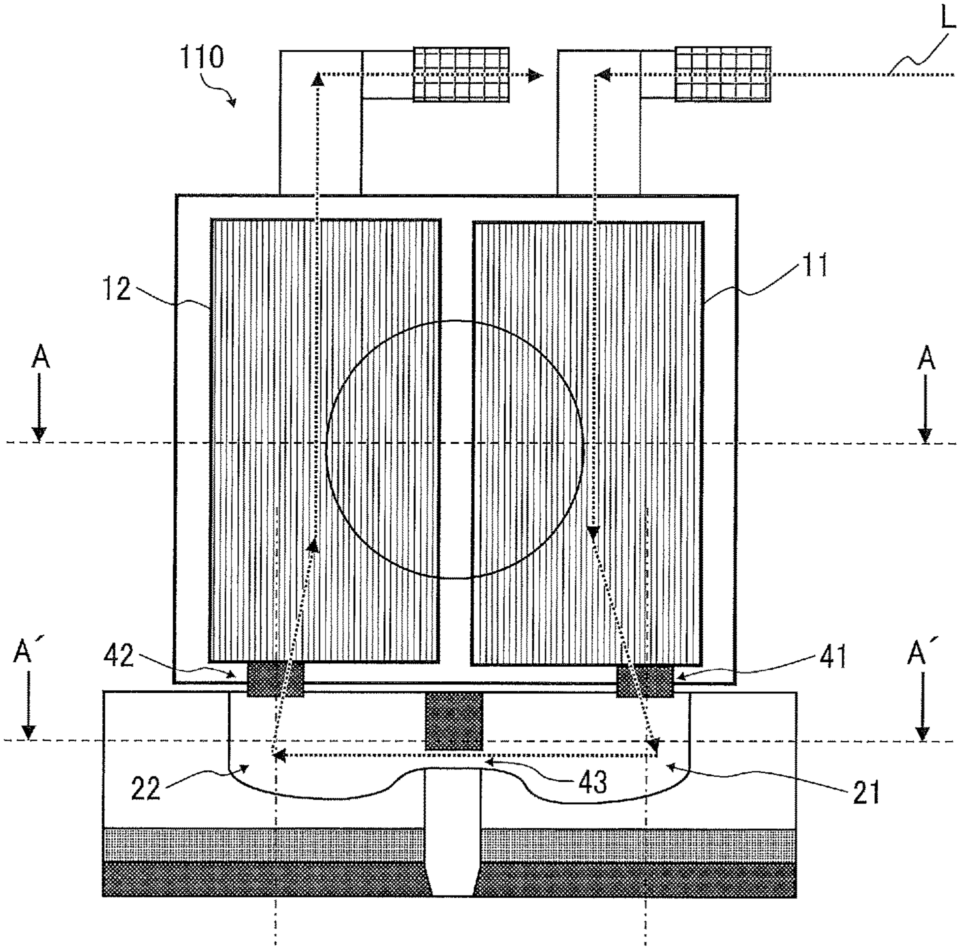
FIG. 4A is a schematic side view and FIGS. 4B and 4C are plan views of a main part of the liquid discharge head according to the first embodiment of the present disclosure.

FIG. 4A is a schematic side view of a head part 110.

Figure 4B:
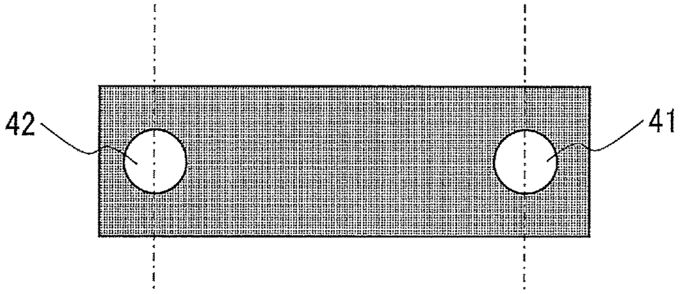
Figure 4C:
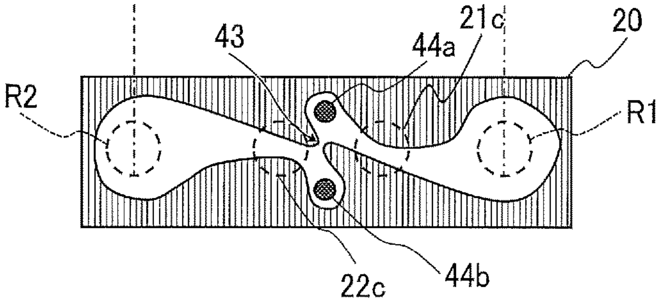

FIGS. 4B and 4C are schematic plan views of the head part 110 of the liquid discharge head 100.

As illustrated in FIG. 3, the liquid discharge head 100 includes a head part 110, an ink cartridge 51, and a supply pump 52. The ink cartridge 51 serves as a liquid storage to store a liquid ink to be supplied to the head part 110. The supply pump 52 feeds the liquid ink from the ink cartridge 51 to the head part 110. The ink cartridge 51 and the head part 110 communicate with each other through a supply tube 53.

Thus, the ink cartridge 51 is configured to store the liquid to be supplied to the first head tank 11, the supply tube 53 is coupled (connected) to the ink cartridge 51 and the first head tank 11, and the supply pump 52 is configured to feed the liquid from the ink cartridge 51 to the first head tank 11 through the supply tube 53.

The supply tube 53 has two paths communicating between the ink cartridge 51 and the head part 110. One path of the supply tube 53 (right side of the supply tube 53 in FIG. 3) until the supply tube 53 branches into two paths (left side of the supply tube 53 in FIG. 3) is coupled to the ink cartridge 51. The liquid discharge head 100 includes a first check valve 55 and a second check valve 56 respectively disposed in the two paths. Further, a filter 54 is disposed in the middle of the supply tube 53.

The supply pump 52 corresponds to a power source in a circulation mechanism of the liquid ink according to the embodiments described below.

[Configuration of Head Part 110]

As illustrated in FIG. 4A, the head part 110 includes a head tank 10 for storing liquid ink, an intermediate chamber 20 for storing liquid ink flowing in from the head tank 10 and supplying the liquid ink to the common chamber 30, and a common chamber 30 for discharging the liquid ink flowing in from the intermediate chamber 20 toward a medium.

The head tank 10 includes multiple head tanks including a first head tank 11 and a second head tank 12. The first head tank 11 and the second head tank 12 have the same shape and independently form a space for storing liquid ink. In this first embodiment, the first head tank 11 is disposed on the upstream side in a circulation direction when the liquid ink is circulated, and the second head tank 12 is disposed on the downstream side in the circulation direction indicated by dotted lines and arrows in FIG. 4A.

The head part 110 includes an intermediate chamber 20 disposed below (at a lower position with respect to) the head tank 10. The head tank 10 includes multiple intermediate chambers that includes a first intermediate chamber 21 and a second intermediate chamber 22 respectively corresponding to the first head tank 11 and the second head tank 12. The first head tank 11 and the first intermediate chamber 21 communicate with each other through a first communicating part 41 disposed in a communicating part between the first head tank 11 and the first intermediate chamber 21. The second head tank 12 and the second intermediate chamber 22 communicate with each other through a second communicating part 42 disposed in a communicating part between the second head tank 12 and the second intermediate chamber 22. The first communicating part 41 and the second communicating part 42 form a joint part between the head tank 10 and the intermediate chamber 20.

Each of the first intermediate chamber 21 and the second intermediate chamber 22 includes a space storable the liquid ink. The shapes of spaces in the first intermediate chamber 21 and the second intermediate chamber 22 are the same shape. The head part 110 includes an intermediate penetration part 43 formed between a storage space of the liquid ink of the first intermediate chamber 21 and the storage space of the liquid ink of the second intermediate chamber 22.

The intermediate penetration part 43 is also a hole formed through a partition wall that separates the first intermediate chamber 21 and the second intermediate chamber 22. The liquid flows between the first intermediate chamber 21 and the second intermediate chamber 22 through the intermediate penetration part 43.

Thus, a partition wall is formed between the first communicating part 41 and the second communicating part 42, and the intermediate penetration part 43 penetrates through the partition wall.

The head part 110 includes a common chamber 30 disposed below the intermediate chamber 20. The common chamber 30 includes multiple nozzles 31 from each of which a liquid ink is to discharged as liquid droplets. The nozzles 31 are arranged in a plane toward the discharge destination (downward direction in FIG. 3). The liquid discharge head 100 has a nozzle surface including multiple nozzles 31 (see FIG. 3) from each of which the liquid ink is discharged.

The liquid ink flows from the first intermediate chamber 21 and the second intermediate chamber 22 into the common chamber 30 through a common penetration part 44. The common penetration part 44 is formed in each of the first intermediate chamber 21 and the second intermediate chamber 22. For example, the first common penetration part **44*a* is formed in the first intermediate chamber 21, and the second common penetration part 44*b* is formed in the second intermediate chamber 22. The first common penetration part 44*a* and the second common penetration part 44*b* are collectively referred to as a "common penetration part 44**".

As illustrated in FIG. 4C, the common penetration parts 44 are formed in the vicinity of the intermediate penetration part 43 and in the vicinity of a center of the intermediate chamber 20 in a path (channel) through which the liquid ink flows. The center of the intermediate chamber 20 is disposed near a boundary such as the partition wall that separates the first intermediate chamber 21 and the second intermediate chamber 22.

[Flow of Operation of Liquid Discharge Head 100]

Next, an example of the operation of the liquid discharge head 100 is described below with reference to FIGS. 4A to 4C. The dotted lines and arrows indicated by "L" in FIG. 4A illustrates a flow direction of the liquid ink during circulation operation.

When the controller 130 starts the image forming operation, the print controller 137 controls an operation of the head driver 144 to discharge a liquid ink from the nozzle 31. The pressure generator in the common chamber 30 as a discharge part generates a pressure to discharge a liquid ink from the nozzles 31. When the liquid ink is discharged from the nozzle 31, the liquid ink flows from the two intermediate chambers (the first intermediate chamber 21 and the second intermediate chamber 22) into the common chamber 30 so that the common chamber 30 is ready for the subsequent discharge operation. The common penetration part 44 is a channel through which the liquid ink flows from the intermediate chamber 20 to the common chamber 30.

When the supply pump 52 is rotated in the forward direction in order to supply liquid ink to be discharged from the nozzles 31 of the common chamber 30 in the image forming operation, the liquid ink delivered from the ink cartridge 51 flows into the first head tank 11 through the supply tube 53. At this time, foreign matters in the liquid ink are removed when the liquid ink passes through the filter 54 disposed in the middle of the supply tube 53. The first check valve 55 is disposed in a first tube **53*a* of the supply tube 53 that is coupled to the first head tank 11. The first check valve 5 allows the liquid ink to flow from the ink cartridge 51 to the first head tank 11 and prevents the liquid ink from flowing in an opposite direction from the first head tank 11 to the ink cartridge 51. The second check valve 56, disposed in a second tube 53*b* of the supply tube 53 that is coupled to the second head tank 12, prevents the liquid ink from flowing from the ink cartridge 51 to the second head tank 12 and allows the liquid ink to flow in an opposite direction from the second head tank 12 to the ink cartridge 51. Thus, the liquid ink flows out from the second head tank 12** to form a circulation channel.

The supply tube 53 is bifurcated into the first tube **53*a* coupled to the first head tank 11 and the second tube 53*b* coupled to the second head tank 12** to form the circulation channel of the liquid ink in each of the channels.

When the liquid ink flows into the first head tank 11 through the first tube **53*a* of the supply tube 53, the liquid ink flows from the first head tank 11 to the first intermediate chamber 21 through the first communicating part 41. The liquid ink flowing into the first intermediate chamber 21 passes through the intermediate penetration part 43 and flows into the second intermediate chamber 22. The liquid ink flowing into the second intermediate chamber 22 further flows from the second intermediate chamber 22 into the second head tank 12 and then flows into the second tube 53*b* of the supply tube 53**.

The liquid ink flowing from the second head tank 12 into the second tube **53*b* of the supply tube 53 flows toward the ink cartridge 51 through the second check valve 56. At this time, the supply pump 52 continuously feeds the liquid ink from the ink cartridge 51 through the supply tube 53 so that the liquid ink flowing from the second head tank 12 to the second tube 53*b* does not return to the ink cartridge 51 but flows back toward the first check valve 55 in the first tube 53*a* of the supply tube 53. Then, the liquid ink flows into the first head tank 11 through the first tube 53*a* of the supply tube 53. As described above, the liquid ink is circulated inside the liquid discharge head 100 while the supply pump 52** rotates in the forward direction.

As described above, the first head tank 11 is disposed on an upstream side in a flow direction of the liquid ink, and the second head tank 12 is disposed on a downstream side in the flow direction of the liquid ink in a liquid flow of the liquid ink according to the first embodiment.

A flow rate of the liquid ink circulating through the liquid discharge head 100 varies according to a discharge operation of the liquid discharge head 100. If a sedimentary ink is used as a liquid ink, a frequency of liquid flow of the liquid ink may decrease, or the flow rate of the liquid ink may decrease so that a color component stagnates in the circulation channel. The color component easily sediments in the sedimentary ink. The sedimentary ink includes a color component of white color.

To prevent stagnation of the color component in the circulation channel, fluidity of the liquid ink is increased (the flow rate is increased) in the circulation channel, in which the liquid ink circulates, to improve an effect of the stirring operation. Therefore, the liquid discharge head 100 according to the first embodiment has a shape to locally increase the flow rate of the liquid ink in the circulation channel as described below.

[Stirring Operation in Liquid Discharge Head 100]

A stirring operation executed in the liquid discharge head 100 is described below. First, the supply pump 52 is reversely driven in a counterclockwise direction in FIG. 3. Then, the liquid ink stored in the second head tank 12 flows out to the supply tube 53, passes through the second check valve 56, and returns to the ink cartridge 51. Thus, the supply pump 52 is reversely driven to empty the second head tank 12 to reduce a damper effect of the liquid ink and improve circulation performance of the stirring operation.

Thus, the liquid discharge head 100 can improve the circulation performance to circulate the liquid ink to agitate the liquid ink if there is a deposited color component in the liquid ink.

Then, the liquid ink flows from the ink cartridge 51 into the first head tank 11 through the first tube 53*a* of the supply tube 53, and then flows into the empty second head tank 12 through the intermediate chamber 20 and the intermediate penetration part 43. At this time, the liquid ink flows, in the following order, from the first head tank 11 to the first intermediate chamber 21 through the first communicating part 41, passes through the intermediate penetration part 43, and flows from the second intermediate chamber 22 to the second head tank 12 through the second communicating part 42, This circulation operation is continued until the second head tank 12 is filled.

As described above, the liquid discharge head 100 causes the liquid ink to circulate and flow so that the color components that have sedimented can be stirred to improve discharge quality of the liquid discharge head 100 for discharging the liquid ink from the nozzle 31.

The above-described stirring operation may be performed at predetermined time intervals. For example, the stirring process may be executed every several hours when the liquid ink has color components that easily sediment. Further, the controller 130 may execute the stirring operation as a part of an initial operation when the liquid discharge apparatus 1 starts operation before operating the liquid discharge head 100.

The stirring operation according to the first embodiment can stir the liquid ink without executing an unnecessary discharging operation Thus, the liquid discharge head 100 can reduce a decrease in an amount of an image formable from one ink cartridge 51 and increase a so-called "yield".

[Configuration for Improving Fluidity of Liquid Ink]

Next, a configuration of the liquid discharge head 100 that locally increases a flow rate of the liquid ink flowing in the circulation channel when the liquid ink flows in the above-described stirring operation or the like is described below with reference to FIGS. 4A to 4C.

FIG. 4B is a cross-sectional plan view along a line "A-A" in FIG. 4A.

FIG. 4C is a cross-sectional plan view along a line "A'-A'" in FIG. 4A.

As illustrated in FIGS. 4A and 4B, the first communicating part 41 and the second communicating part 42 are disposed on a bottom surface of the head tank 10.

FIG. 4C illustrates a broken-line circle R1 and a broken-line circle R2 that are imaginary circles disposed at positions coaxial with the first communicating part 41 and the second communicating part 42, respectively. The broken line circles R1 and R2 illustrate virtual positions in channel spaces (inner spaces) of the first intermediate chamber 21 and the second intermediate chamber 22.

The first intermediate chamber 21 includes a first narrow part 21*c* (see FIG. 4C) having a diameter smaller than a diameter of the first communicating part 41 in a direction orthogonal to a flow direction of the liquid. The flow direction is indicated by arrow with broken line in FIG. 4A.

The second intermediate chamber 22 includes a second narrow part 22*c* (see FIG. 4C) having a diameter smaller than a diameter of the second communicating part 42 in the direction orthogonal to the flow direction.

That is, the first intermediate chamber 21 has the first narrow part 21*c* (see FIG. 4C), a cross-sectional area of which is smaller than a cross-sectional area of the first communicating part 41 in the direction orthogonal to the flow direction. The first communicating part 41 is a path through which the liquid ink flows from the first head tank 11 into the first intermediate chamber 21.

Further, the second intermediate chamber 22 has the second narrow part 22*c* (see FIG. 4C), a cross-sectional area of which is smaller than a cross-sectional area of the second communicating part 42 in the direction orthogonal to the flow direction. The second communicating part 42 is a path through which the liquid ink flows from the second intermediate chamber 22 into the second head tank 12.

Inner spaces (channel spaces) of the first intermediate chamber 21 and the second intermediate chamber 22 are formed so that diameters of the inner spaces (channel spaces) at the virtual positions are equal to or smaller than the diameters of the first communicating part 41 and the second communicating part 42, respectively.

That is, the first intermediate chamber 21 is formed so that a cross-sectional area of the channel in the first intermediate chamber 21 downstream of the first communicating part 41 is equal to or smaller than a cross-sectional area of the channel in the first communicating part 41 in a path through which the liquid ink flows from the first head tank 11 into the first intermediate chamber 21.

Similarly, the second intermediate chamber 22 is formed so that a diameter of a channel in the second intermediate chamber 22 coaxial with the second communicating part 42 is equal to or smaller than a diameter of the second communicating part 42 when the second communicating part 42 communicating with the second head tank 12 is compared with a part of the internal space of the second intermediate chamber 22 coaxial with the second communicating part 42.

That is, the second intermediate chamber 22 has a second narrow part 22*c* (see FIG. 4C) in which a cross-sectional area of the channel in the second intermediate chamber 22 upstream of the second communicating part 42 is equal to or smaller than a cross-sectional area of the channel in the second communicating part 42 in the direction orthogonal to the flow direction. The second communicating part 42 is a path through which the liquid ink flows from the second intermediate chamber 22 into the second head tank 12.

The first intermediate chamber 21 and the second intermediate chamber 22 having such shapes can locally increase the flow rate of the liquid ink flowing from the second intermediate chamber 22 to the common chamber 30 to improve stirring efficiency of the liquid ink when the liquid ink is discharged from the nozzle 31.

The first intermediate chamber 21 includes the first narrow part 21*c*, a cross-sectional area of which is smaller than the cross-sectional area of the first communicating part 41 in the direction orthogonal to the flow direction, and the second intermediate chamber 22 includes a second narrow part 22*c*, a cross-sectional area of which is smaller than the cross-sectional area of the second communicating part 42 in the direction orthogonal to the flow direction.

The intermediate penetration part 43 penetrates through a partition wall between the first intermediate chamber 21 and the second intermediate chamber 22. In the direction orthogonal to the flow direction, the cross-sectional area of the intermediate penetration part 43 is equal to or smaller than the cross-sectional area of the channel from the first communicating part 41 to the common penetration part 44 that is a channel through which the liquid ink flows to the nozzle 31 in the common chamber 30. In other words, a flow rate of the liquid ink flowing in the intermediate penetration part 43 is faster than a flow rate of the liquid ink flowing from the first intermediate chamber 21 to the common penetration part 44.

In the circulation channel in the liquid discharge head 100, the cross-sectional area of the channel in the first intermediate chamber 21 is made smaller than the cross-sectional area of the channel of a connecting part (first communicating part 41) between the first head tank 11 and the first intermediate chamber 21. Similarly, in the circulation channel in the liquid discharge head 100, the cross-sectional area of the channel in the second intermediate chamber 22 is made smaller than the cross-sectional area of the channel of a connecting part (second communicating part 42) between the second head tank 12 and the second intermediate chamber 22.

The shape of the channel in the above-described case may be a shape that gradually narrows from the upstream side to the downstream side in the flow direction of the liquid ink, or a shape that steeply narrows at a specific position.

In any of the shapes as described-above, the channel uses a shape that increases momentum of the liquid ink flowing in the liquid discharge head 100 to increase a force to wash away and stir the color components sedimented (deposited) in the first intermediate chamber 21 and the second intermediate chamber 22 during the circulation of the liquid ink, in particular. That is, the first intermediate chamber 21 and the second intermediate chamber 22 have a shape that improves the stirring performance of the liquid discharge head 100.

Further, the cross-sectional area of the channel in the intermediate penetration part 43 is made the narrowest in the circulation channel of the liquid ink in the intermediate chamber 20. As illustrated in FIG. 4C, the channel toward the common penetration part 44 is formed narrower than the channels in the first communicating part 41 and the second communicating part 42 in each of the first intermediate chamber 21 and the second intermediate chamber 22.

The channels in the first intermediate chamber 21 and the second intermediate chamber 22 are gradually narrowed toward the common penetration part 44 (toward a center of the intermediate chamber 20). The intermediate penetration part 43 is formed narrower than the narrowest part of the channel formed in the first intermediate chamber 21 and the second intermediate chamber 22. That is, the intermediate penetration part 43 is made as the narrowest part in which the cross-sectional area of the channel is the smallest in the intermediate chamber 20.

As a result, the liquid discharge head 100 can increase the momentum of the liquid ink flowing from the first intermediate chamber 21 into the second intermediate chamber 22 during the circulation operation of the liquid ink. Therefore, the circulation channel is locally made narrow to more efficiently wash away the color components stayed (sedimented) in the first intermediate chamber 21 and the second intermediate chamber 22.

Thus, a cross-sectional area of the intermediate penetration part 43 is smaller than a cross-sectional area of the smallest part in each of the first intermediate chamber 21 and the second intermediate chamber 22 in the direction orthogonal to the flow direction.

A cross-sectional area of the intermediate penetration part 43 is smaller than the cross-sectional area of each of the first narrow part 21*c* and the second narrow part 22*c*.

The cross-sectional area of the channel in the intermediate penetration part 43 is preferably smaller than cross-sectional areas of the channels of other portions of the circulation channel of the liquid ink. For example, a width and a height of the intermediate penetration part 43 may be made narrower or lower than a width and a height of each of the first intermediate chamber 21 and the second intermediate chamber 22. Regardless of dimension made narrower in either direction, the cross-sectional area of the channel in the intermediate penetration part 43 are made the narrowest in the circulation channel of the liquid ink so that the flow rate of the liquid ink circulating in the liquid discharge head 100 becomes faster when the liquid ink passes through the intermediate penetration part 43. As a result, the liquid discharge head 100 generates a circulation flow that moves and circulates the color components accumulated (sedimented) in the first intermediate chamber 21 and the second intermediate chamber 22 so that the liquid discharge head 100 can improve a stirring power to stir the liquid ink in the first intermediate chamber 21 and the second intermediate chamber 22.

As illustrated in FIG. 4A, a cross-sectional shape in a longitudinal direction of the first intermediate chamber 21 and the second intermediate chamber 22 are preferably inclined downward toward a common penetration part 44 serving as a liquid channel to the common chamber 30.

Particularly, bottom surfaces of the first intermediate chamber 21 and the second intermediate chamber 22 are inclined downward toward the common penetration part 44 corresponding to a flow direction of the liquid ink.

Since FIG. 4A illustrates a cross-section of the head part 110 along a line passing though the intermediate penetration part 43 in FIG. 4C so that the bottom surfaces of the first intermediate chamber 21 and the second intermediate chamber 22 inclined upward in the vicinity of the intermediate penetration part 43.

However, in a cross-section of the head part 110 along a line passing though the common penetration part 44 in FIG. 4C, the bottom surfaces of the first intermediate chamber 21 and the second intermediate chamber 22 gradually inclined downward toward the common penetration part 44.

As a result, the liquid discharge head 100 can increase fluidity of the color components contained in the liquid ink and further improve a degree of stirring of the color components that are likely to sediment. That is, the liquid discharge head 100 can improve the circulation performance of the liquid ink.

Figure 8:
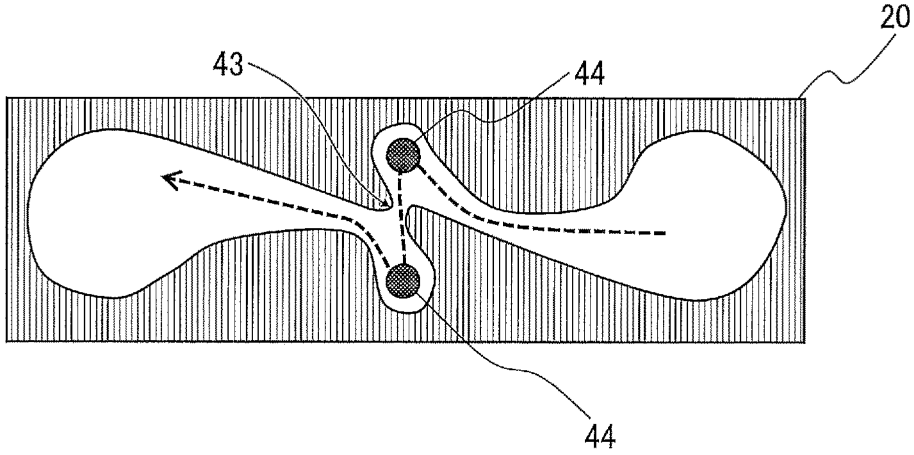
FIG. 8 is a plan view of a main part of the liquid discharge head according to a fifth embodiment of the present disclosure.

As illustrated in FIG. 8, the common penetration parts 44 of the intermediate chamber 20 are formed in the vicinity of the intermediate penetration part 43 serving as a narrow part in the first intermediate chamber 21 and the second intermediate chamber 22.

That is, the common penetration parts 44 are respectively disposed at positions at which the liquid ink circulates in the circulation channel as indicated by a broken line and arrow in FIG. 8.

In other words, the common penetration part 44 is formed in the vicinity of an end part of the intermediate penetration part 43 that connects the first intermediate chamber 21 and the second intermediate chamber 22.

Thus, the first common penetration part 44*a*, the second common penetration part 44*b*, and the intermediate penetration part 43 are disposed on a circulation channel in the first intermediate chamber 21 and the second intermediate chamber 22.

The liquid discharge head 100 includes the intermediate penetration part 43 and the common penetration part 44, as disposed above as an example. Thus, a position of the common penetration part 44 is prevented from becoming a blind spot in the channel flowing between the first intermediate chamber 21 and the second intermediate chamber 22. Thus, the liquid discharge head 100 can improve a circulation flow of the liquid ink in the circulation channel and a discharge performance of the liquid ink.

Second Embodiment of Liquid Discharge Head

Figure 5:
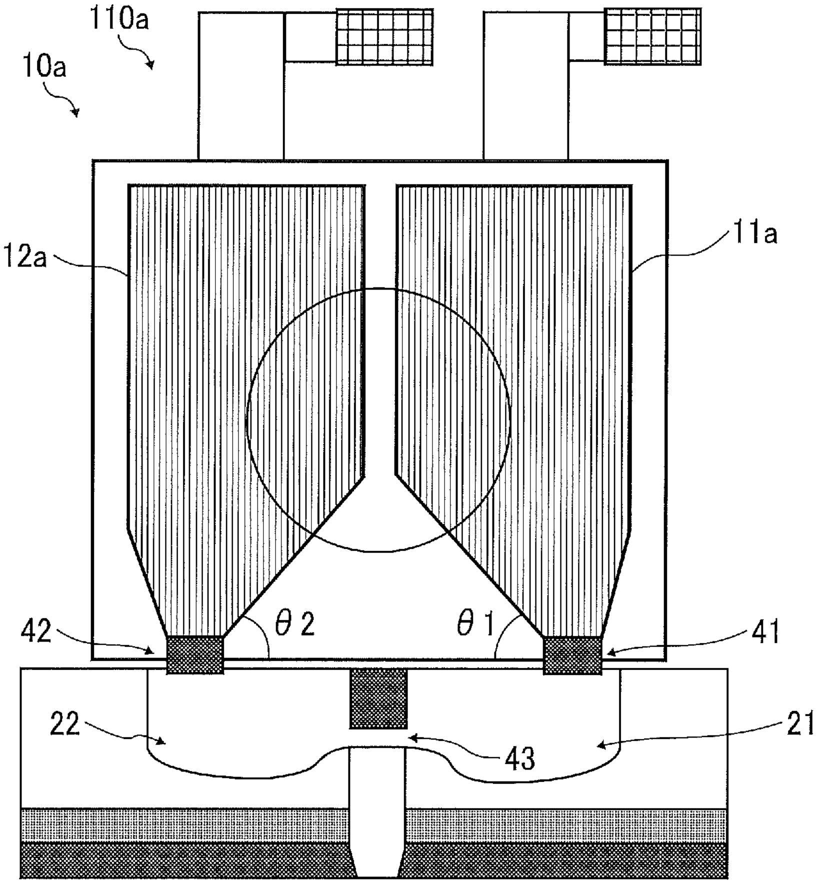
FIG. 5 is a schematic side view of a main part of the liquid discharge head according to a second embodiment of the present disclosure.

Next, another configuration of the head part 110 of the liquid discharge head 100 is described below with reference to FIG. 5. Hereinafter, the same components as those already described are denoted by the same reference numerals and the detailed description thereof will be omitted. As illustrated in FIG. 5, the head part 110*a* according to the present embodiment the head tank 10*a* having a characterized shape.

Each of the first head tank 11*a* and the second head tank 12*a* according to the second embodiment has a shape in which lower parts of the first head tank 11*a* and the second head tank 12*a* are inclined toward the first communicating part 41 and the second communicating part 42, respectively. Further, the lower parts of the first head tank 11*a* and the second head tank 12*a* coupled to the first communicating part 41 and the second communicating part 42 are made narrower than upper parts of the first head tank 11*a* and the second head tank 12*a* coupled to the supply tubes 53.

Since the color component sediments downward to a lower part of each of the first head tank 11*a* and the second head tank 12*a*, the first head tank 11*a* and the second head tank 12*a* having an inclined shape allows the color component to flow naturally downward to the lower parts of the first head tank 11*a* and the second head tank 12*a*. Thus, the liquid discharge head 100 can improve the fluidity of the color components in the circulation channel. Particularly, the liquid discharge head 100 can prevent the color components from sedimentation in the joint part between the first communicating part 41 and the second communicating part 42 of the first head tank 11*a* and the second head tank 12*a*, respectively.

An angle θ1 of an interior of the first head tank 11*a* at a joint part between the first head tank 11*a* and the first communicating part 41 may be an acute angle. Similarly, the angle θ2 of an interior of the second head tank 12*a* at a joint part between the second head tank 12*a* and the second communication part 42 may be an acute angle.

Thus, an interior wall of the first head tank 11*a* forms an acute angle θ1 with a bottom surface of the first head tank 11*a* at a joint part between the first head tank 11*a* and the first communicating part 41, and an interior wall of the second head tank 12*a* forms an acute angle θ2 with a bottom surface of the second head tank 12*a* at a joint part between the second head tank 12 and the second communication part 42.

Third Embodiment of Liquid Discharge Head

Figure 6:
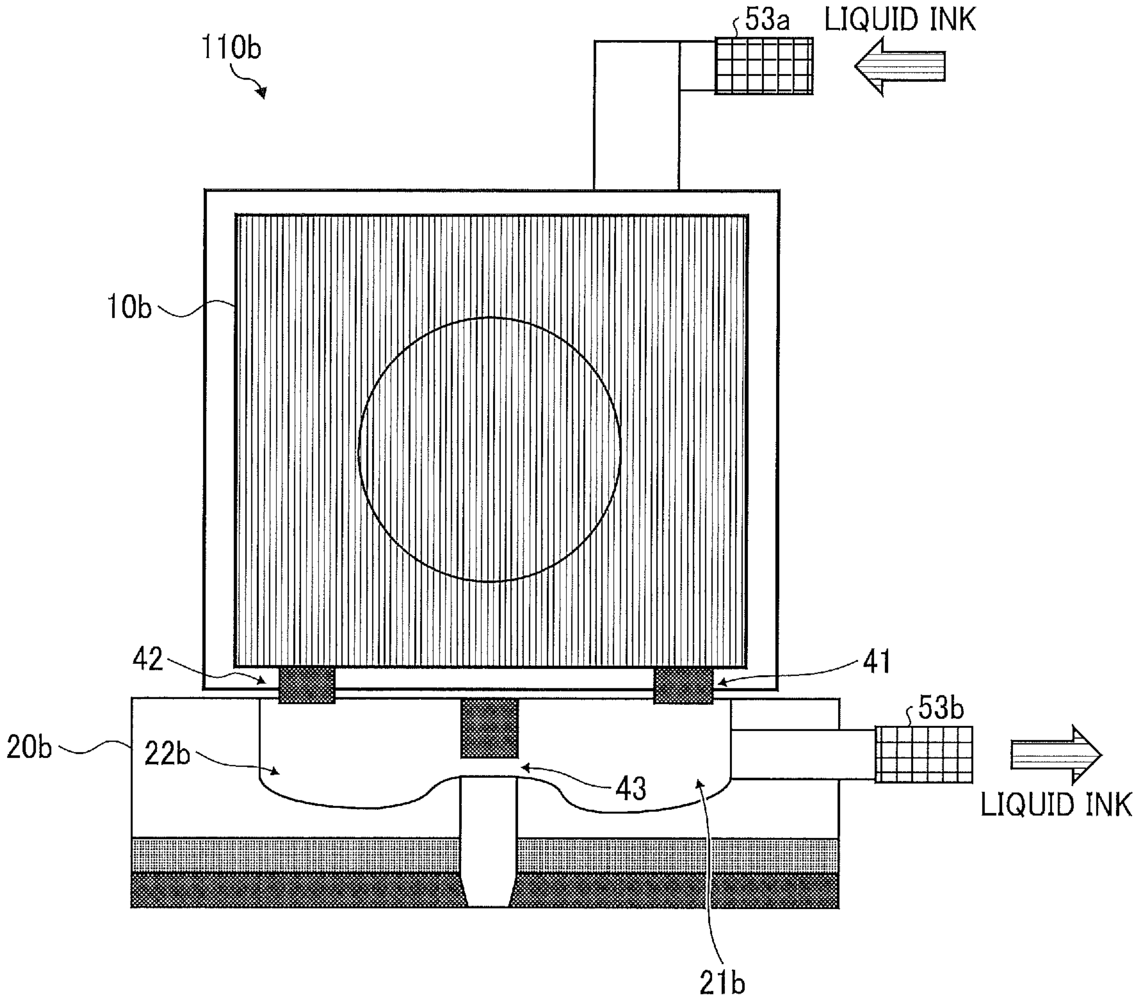
FIG. 6 is a schematic side view of a main part of the liquid discharge head according to a third embodiment of the present disclosure.

Next, a further another configuration of the head part 110 of the liquid discharge head 100 is described below with reference to FIG. 6. Hereinafter, the same components as those already described are denoted by the same reference numerals and the detailed description thereof will be omitted. As illustrated in FIG. 6, a head part 110*b* according to a third embodiment has a characterized configuration in each of the head tank 10*b* and the intermediate chamber 20*a*.

In the liquid discharge head 100*b*, a first tube 53*a* as a first tube is coupled to a head tank 10*b* as a head tank. The first head tank 11 and the second head tank 12 according to the first embodiment (see FIG. 4A to 4C) are formed as a single body in the head tank 10*b*. Thus, the liquid ink flows into the head tank 10*b* through the first tube 53*a*.

The liquid discharge head 100*b* includes a second tube 53*b* serving as a second tube coupled to the first intermediate chamber 21*b*. The liquid ink flows from the head tank 10*b* to a first intermediate chamber 21*b* and a second intermediate chamber 22*b* through the first communication part 41 and the second communication part 42, respectively, to circulate the liquid flowing from the head tank 10*b*.

When the supply pump 52 (see FIG. 3) is rotated in the forward direction (clockwise direction in FIG. 3) to circulate the liquid ink in the circulation channel, the liquid ink flowing from the head tank 10*b* into the first intermediate chamber 21*b* and the second intermediate chamber 22*b* circulates from the first intermediate chamber 21*b* to an exterior of the head part 110 through the second tube 53*b*.

Thus, the supply pump 52 is configured to feed (supply) the liquid to the head tank 10*b* through the first tube 53*a* and discharge the liquid from the first intermediate chamber 21*b* through the second tube 53*b*.

When the liquid is fed from the second intermediate chamber 22 to the second head tank 12 as a circulation channel as in the above-described liquid discharge head 100, there is a concern that the liquid ink stored in the second head tank 12 acts as a damper to hinder a movement of the liquid ink flowing from the second intermediate chamber 22 to the second head tank 12. In the above case, a flow amount of a liquid supply by the supply pump 52 greatly exceeds a recommended value. Thus, there is also a concern that a load on the supply pump 52 may become excessive.

Accordingly, the liquid ink is fed from the ink cartridge 51 to the head tank 10*b* via the first tube 53*a*, is fed from the head tank 10*b* to the first intermediate chamber 21*b* and the second intermediate chamber 22*b*, is fed from the first intermediate chamber 21*b* and the second intermediate chamber 22*b* to an exterior of the head part 110*b* via the second tube 53*b* so that the liquid ink circulates through the liquid discharge head 100. When the liquid ink flows from the intermediate chamber 20*b* outside the head part 110*b* through the second tube 53*b*, the liquid ink does not flow back to the head tank 10*b* from the intermediate chamber 20*b* to circulate the liquid ink. Thus, the liquid discharge head 100 can reduce the load on the supply pump 52 during circulation of the liquid ink and extends a service life of the supply pump 52.

Fourth Embodiment of Liquid Discharge Head

Figure 7:
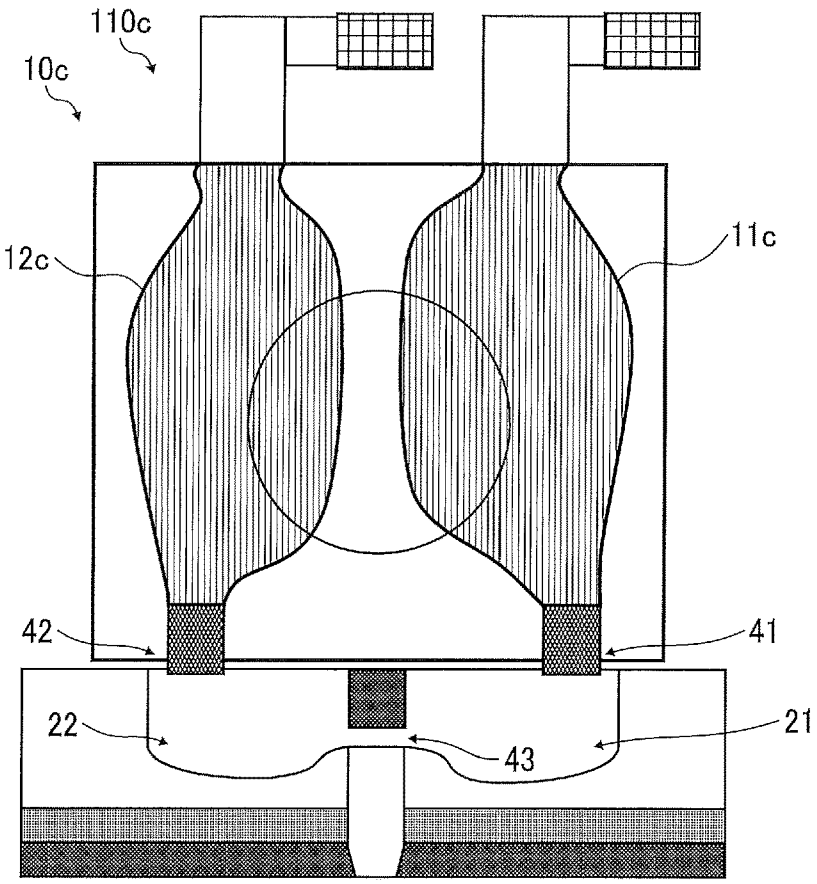
FIG. 7 is a schematic side view of a main part of the liquid discharge head according to a fourth embodiment of the present disclosure.

Next, a further another configuration of the head part 110 of the liquid discharge head 100 according to a fourth embodiment is described below with reference to FIG. 7. Hereinafter, the same components as those already described are denoted by the same reference numerals and the detailed description thereof will be omitted. As illustrated in FIG. 7, the head part 110*c* according to the fourth embodiment has a characterized shape of the head tank 10*c*.

The first head tank 11*c* and the second head tank 12*c* according to the fourth embodiment have shapes tapering toward the first communicating part 41 and the second communicating part 42. In other words, the first head tank 11*c* and the second head tank 12*c* have tapered shape so that the cross-sectional areas of the channel of the first head tank 11*c* and the second head tank 12*c* gradually changes (decreases or increases) in a flow direction of the liquid (downward or upward direction in FIG. 7). That is, lower parts of the first head tank 11*c* and the second head tank 12*c* are respectively narrower than upper parts of the first head tank 11*c* and the second head tank 12*c*.

A cross-sectional area of the first head tank 11*c* in the direction orthogonal to the flow direction gradually decreases toward the first communicating part 41, and a cross-sectional area of the second head tank 11*c* in the direction orthogonal to the flow direction gradually decreases toward the second communicating part 42.

The upper part of each of the first head tank 11*c* and the second head tank 12*c* are coupled to the supply tube 53. The lower parts of the first head tank 11*c* and the second head tank 12*c* respectively communicate with the first communicating part 41 and the second communicating part 42. For example, a wall surface of the first head tank 11*c* extends from the upper part that is a joint part between the first head tank 11*c* and the supply tube 53 to the first communicating part 41.

The wall surface of the first head tank 11*c* has a shape that is widest in the vicinity of a center in a height direction (vertical direction in FIG. 7) of the first head tank 11*c*. The first head tank 11*c* has a bag shape, a width of which becomes narrower (decreases) toward the first communicating part 41. The shape of the second head tank 12*c* is also the same as the shape of the first head tank 11*c* as described above.

Thus, each of the first head tank 11*c* and the second head tank 12*c* has a shape of bag in which the cross-sectional area of each of the first head tank 11*c* and the second head tank 12*c* is largest in a center of the first head tank 11*c* and the second head tank 12*c* in a vertical direction (height direction).

The color component sediments downward to the lower part of the first head tank 11*c* and the second head tank 12*c*. The first head tank 11*c* and the second head tank 12*c* have the tapered shapes tapered in the flow direction of the liquid ink. That is, the lower parts of the first head tank 11*c* and the second head tank 12*c* are narrowed toward the first communicating part 41 and the second communicating part 42, respectively. Thus, the color component in the liquid ink naturally flows downward in the first head tank 11*c* and the second head tank 12*c* to reduce sedimentation of the color component in the liquid ink in the first head tank 11*c* and the second head tank 12*c*. Thus, the liquid discharge head 100 can improve the fluidity of the color components in the circulation channel. Particularly, the color component is likely to stay in the vicinity of a joint part between the first head tank 11*a* and the first communication part 41, and in the vicinity of a joint part between the second head tank 12*a* and the second communication part 42. Therefore, the material used for each of the first head tank 11*c* and the second head tank 12*c* preferably has a hardness in a degree in which the first head tank 11*c* and the second head tank 12*c* do not loosen (deform) outside in the vicinity of the first communicating part 41 and the second communicating part 42 by mass (weight) of the color component sedimented in the liquid ink in the lower part of the first head tank 11*c* and the second head tank 12*c*.

The liquid discharge apparatus 1 according to an embodiment of the present invention can maintain and improve the discharge quality of liquid ink while improving the production efficiency.

The present disclosure is not limited to specific embodiments described above, and numerous additional modifications and variations are possible in light of the teachings within the technical scope of the appended claims. It is therefore to be understood that the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments such as the CPU131 and the print controller 137 forming the image forming processor may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A liquid discharge head comprising:

a first head tank configured to store a liquid;

a first intermediate chamber storing the liquid flowing from the first head tank;

a second intermediate chamber storing the liquid flowing from the first intermediate chamber in a flow direction of the liquid;

a second head tank storing a liquid flowing from the second intermediate chamber;

a first communicating part communicating with the first head tank and the first intermediate chamber;

a second communicating part communicating with the second head tank and the second intermediate chamber;

a discharge part configured to discharge a liquid supplied from the first intermediate chamber and the second intermediate chamber;

a partition wall disposed between the first communicating part and the second communicating part; and an intermediate penetration part penetrating through the partition wall, wherein the first intermediate chamber includes a first narrow part, a cross-sectional area of which is smaller than a cross-sectional area of the first communicating part in a direction orthogonal to the flow direction, and the second intermediate chamber includes a second narrow part, a cross-sectional area of which is smaller than a cross-sectional area of the second communicating part in the direction orthogonal to the flow direction.

2. The liquid discharge head according to claim 1, wherein a cross-sectional area of the intermediate penetration part is smaller than the cross-sectional area of each of the first narrow part and the second narrow part in the direction orthogonal to the flow direction.

3. The liquid discharge head according to claim 1, wherein an interior wall of the first head tank forms an acute angle with a bottom surface of the first head tank at a joint part between the first head tank and the first communicating part, and an interior wall of the second head tank forms an acute angle with a bottom surface of the second head tank at a joint part between the second head tank and the second communication part.

4. The liquid discharge head according to claim 1, further comprising:

an ink cartridge configured to store the liquid to be supplied to the first head tank;

a supply tube coupled to the ink cartridge and the first head tank; and a supply pump configured to feed the liquid from the ink cartridge to the first head tank through the supply tube.

5. The liquid discharge head according to claim 4, wherein the supply tube is bifurcated into:

a first tube coupled to the first head tank, the first tube including a first check valve configured to allow the liquid to flow from the ink cartridge to the first head tank and prevent the liquid from flowing from the first head tank to the ink cartridge; and a second tube coupled to the second head tank, the second tube including a second check valve configured to prevent the liquid from flowing from the ink cartridge to the second head tank and allow the liquid to flow from the second head tank to the ink cartridge.

6. The liquid discharge head according to claim 1, wherein a cross-sectional area of the first head tank, in the direction orthogonal to the flow direction, gradually decreases toward the first communicating part, and a cross-sectional area of the second head tank in the direction orthogonal to the flow direction gradually decreases toward the second communicating part.

7. The liquid discharge head according to claim 6, wherein each of the first head tank and the second head tank has a shape of a bag in which the cross-sectional area thereof is largest in a center thereof in a vertical direction.

8. The liquid discharge head according to claim 1, wherein the first intermediate chamber includes a first common penetration part in a first vicinity of the intermediate penetration part, the first common penetration part communicating with the discharge part, and the second intermediate chamber includes a second common penetration part in a second vicinity of the intermediate penetration part, the second common penetration part communicating with the discharge part.

9. The liquid discharge head according to claim 8, wherein the first common penetration part, the second common penetration part, and the intermediate penetration part are disposed on a circulation channel in the first intermediate chamber and the second intermediate chamber.

10. The liquid discharge head according to claim 8, wherein bottom surfaces of the first intermediate chamber and the second intermediate chamber are respectively inclined downward toward the first common penetration part and the second common penetration part.

11. The liquid discharge head according to claim 1, wherein the liquid is a sedimentary ink including a component that sediments in the sedimentary ink.

12. The liquid discharge head according to claim 11, wherein the sedimentary ink includes a color component of white color.

13. A liquid discharge apparatus comprising:

the liquid discharge head according to claim 1; and circuitry configured to generates a drive waveform to drive the liquid discharge head according to an image to be formed on a medium.

14. A liquid discharge head comprising:

a head tank configured to store a liquid;

a first intermediate chamber storing the liquid flowing from the head tank;

a second intermediate chamber storing the liquid flowing from the head tank;

a first communicating part communicating with the head tank and the first intermediate chamber;

a second communicating part communicating with the head tank and the second intermediate chamber;

a discharge part configured to discharge a liquid supplied from the first intermediate chamber and the second intermediate chamber;

a partition wall disposed between the first communicating part and the second communicating part; and an intermediate penetration part penetrating through the partition wall, wherein the first intermediate chamber includes a first narrow part, a cross-sectional area of which is smaller than a cross-sectional area of the first communicating part in a direction orthogonal to a flow direction of the liquid, and the second intermediate chamber includes a second narrow part, a cross-sectional area of which is smaller than a cross-sectional area of the second communicating part in the direction orthogonal to the flow direction.

15. The liquid discharge head according to claim 14, further comprising:

a first tube coupled to the head tank;

a second tube coupled to the first intermediate chamber; and a supply pump configured to feed the liquid to the head tank through the first tube and discharge the liquid from the first intermediate chamber through the second tube.

* * * * *